United States Patent
Rozenberg et al.

(10) Patent No.: US 10,546,386 B2
(45) Date of Patent: Jan. 28, 2020

(54) REMOTE DETECTING AND TRACKING OF OBJECTS

(71) Applicant: ISRAEL AEROSPACE INDUSTRIES LTD., Lod (IL)

(72) Inventors: Ohad Rozenberg, Yad Binyamin (IL); Haim Somech, Raanana (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 15/555,393

(22) PCT Filed: Mar. 1, 2016

(86) PCT No.: PCT/IL2016/050234
§ 371 (c)(1),
(2) Date: Sep. 1, 2017

(87) PCT Pub. No.: WO2016/139664
PCT Pub. Date: Sep. 9, 2016

(65) Prior Publication Data
US 2018/0040140 A1    Feb. 8, 2018

(30) Foreign Application Priority Data

Mar. 2, 2015  (IL) .......................................... 237494
Oct. 18, 2015  (IL) .......................................... 242136

(51) Int. Cl.
G06K 9/00    (2006.01)
G06T 7/73    (2017.01)
(Continued)

(52) U.S. Cl.
CPC ............ G06T 7/73 (2017.01); G06K 9/00771 (2013.01); G06K 9/46 (2013.01); G06T 7/246 (2017.01);
(Continued)

(58) Field of Classification Search
CPC ........... G06T 7/73; G06T 7/246; G06T 7/248; G06T 7/254; G06T 2207/10016;
(Continued)

(56) References Cited

U.S. PATENT DOCUMENTS 7,184,574 B1    2/2007  Zahavi
7,623,152 B1    11/2009  Kaplinsky
(Continued)

FOREIGN PATENT DOCUMENTS

WO         2013168169 A2    11/2013
WO    WO 2014/111923          7/2014

OTHER PUBLICATIONS

Norouznezhad, et al., "A High Resolution Smart Camera With Gige Vision Extension for Surveillance Applications", Distributed Smart Cameras, ICDSC 2008. Second ACM/IEEE International Conference on. IEEE, 2008, 8 Pages.

*Primary Examiner* — Jose L Couso
(74) *Attorney, Agent, or Firm* — Dorsey & Whitney LLP

(57) ABSTRACT

The presently disclosed subject matter includes a method and system configured for enabling using a high resolution imaging assembly for surveying large areas as well as for tracking objects within the surveyed area, notwithstanding the bandwidth limitation of the communication link.

23 Claims, 9 Drawing Sheets

(51) Int. Cl.
*G06T 7/246* (2017.01)
*G06K 9/46* (2006.01)

(52) U.S. Cl.
CPC ............... *G06T 2207/10016* (2013.01); *G06T 2207/30232* (2013.01)

(58) Field of Classification Search
CPC . G06T 2207/20104; G06T 2207/30202; G06T 2207/10032; G06T 2207/20021; G06T 2207/30196; G06T 2207/30236; G06K 9/00771; G06K 9/46; G06K 9/6201; G06K 9/00711; G06K 9/4604; H04N 5/144; H04N 5/232; H04N 5/147; H04N 5/23203; H04N 5/23206; H04N 5/23216; H04N 5/23232; H04N 5/23238; H04N 5/23296; H04N 5/235; H04N 5/2355; H04N 5/2628; H04N 5/265; H04N 5/35527; H04N 7/18; H04N 7/181; H04N 7/183; H04N 7/185; H04N 7/188; H04N 21/25808; H04N 21/2662; H04N 21/4621; G08B 13/19641; G08B 13/1965; G08B 13/19652; G08B 13/1966; G08B 13/19673; G08B 13/19682; G08B 13/19684; G08B 13/19697; G08B 13/19656; G08B 13/19645; G08B 13/19695; G08B 13/19667; G01S 3/7864; H04B 7/18504; B60R 25/102; B60R 25/305; B64D 45/0015; B64D 2045/0045; G08G 1/205
See application file for complete search history.

(56) References Cited

U.S. PATENT DOCUMENTS

| | | | |
|---|---|---|---|
| 2003/0063004 A1* | 4/2003 | Anthony | B60R 25/102 340/574 |
| 2004/0008253 A1 | 1/2004 | Monroe | |
| 2008/0036864 A1* | 2/2008 | McCubbrey | H04N 7/18 348/159 |
| 2009/0219387 A1 | 9/2009 | Marman et al. | |
| 2009/0263021 A1 | 10/2009 | Takamori et al. | |
| 2013/0050486 A1* | 2/2013 | Omer | H04N 21/23614 348/144 |
| 2013/0290557 A1* | 10/2013 | Baratz | H04L 65/60 709/231 |
| 2014/0152770 A1 | 6/2014 | Carides et al. | |
| 2016/0227259 A1* | 8/2016 | Brav | H04N 5/23206 |
| 2017/0006340 A1* | 1/2017 | Enke | H04N 21/440281 |
| 2017/0256288 A1* | 9/2017 | Ai | G11B 27/28 |
| 2018/0165933 A1* | 6/2018 | Siminoff | H04N 7/186 |

* cited by examiner

REMOTE DETECTING AND TRACKING OF OBJECTS

FIELD OF THE PRESENTLY DISCLOSED SUBJECT MATTER

The presently disclosed subject matter relates to the remote tracking of objects by a sensing device.

BACKGROUND

In many applications, an operator of a remote surveillance system controls a remote image sensor via a communication link. Examples of such applications include traffic control, border control, search and rescue operations, land surveys, police surveillance, military applications, etc.

In general, a system for surveillance and remote tracking of objects (herein termed surveillance system) comprises a control unit at one location and a sensing unit at another location remote from the control unit, the control unit and sensing unit communicating over a communication link. The sensing unit, which comprises an image sensor, can be used for surveying a scene and transmitting sensing-data, which includes data that was acquired by the sensing unit or data generated by the sensing unit in relation to the acquired data (e.g. captured images, object-data characterizing identified objects in the captured images etc.) to the control unit. At the control unit the images can be displayed on a display for viewing by an operator. Furthermore, the sensing unit can be configured to locate and track a sighted object. The control unit provides to the sensing unit control-data, including for example, different types of commands, such as lock and track commands, zoom commands, centering commands, etc.

In some applications such as Terrain Dominance applications, it is desirable to capture large areas (e.g. of the ground) in a short time. One known solution involves using an imaging assembly suitably mounted onboard an aircraft, comprising a camera (CCD or CMOS) for capturing aerial images of ground terrain. The imaging assembly is configured with a motor for rotating an axis on which the camera is mounted, and for generating a sweeping back-and-forth motion shifting a field of view of the at least one camera. Multiple images of the ground terrain are captured and are synthetically combined into a single continuous image.

While this approach may provide imaging of a terrain area larger than the field of view (FOV) of the camera, it requires manufacturing a designated imaging assembly with a sweeping mechanism, capturing multiple images, and using fusion algorithms for generating the complete single image.

GENERAL DESCRIPTION

The presently disclosed subject matter includes a remote sensing unit comprising a high resolution imaging assembly (otherwise known as "image forming system"). The high resolution imaging assembly comprises a high resolution sensor and a lens assembly with a suitably wide field of view (FOV) and suitable angular resolution for capturing wide angle and high resolution images. Nowadays, such high resolution sensors can comprise dozens of mega pixels (e.g. at least 25 mega pixels) and up to Giga pixels. The resolution of such cameras is bound to rise in the future as technology progresses. With today's technology, depending on the desired Ground Sample Distance (GSD), high resolution images can cover areas ranging from ten square kilometers and up to hundreds of square kilometers. These features are well suited for terrain dominance related applications which require achieving the ability to control an area using predominantly advanced remote-controlled technologies and autonomous means.

The high resolution imaging assembly disclosed herein can be suitably mounted on an airborne vehicle, or some other device located at a high vantage point, and used for capturing high resolution images of ground terrain while enabling to capture a large area in each single frame.

As mentioned above, the high resolution imaging assembly can be configured with a wide FOV and zoom capability to enable a control unit operator to operate the imaging assembly at various altitudes, and to select different GSDs to obtain different sizes of area coverage.

In some operational scenarios, bandwidth limitations of the communication link between the high resolution sensing unit and a respective control unit precludes a sufficiently fast transmission of the captured high resolution images due to their large size. For example, consider a video frame rate of 25 or 30 frames per second, and high resolution images of dozens of mega pixels or greater. Moreover, in a color video stream, every pixel has three bytes of color information, increasing the size of the transmitted data.

Communication systems available today are capable of transferring several megabits of information in one second, a transfer rate which is insufficient for transferring a high resolution image and/or video as disclosed above even after using high compressing methods. Furthermore, technological progress in the field of high definition optical sensors is currently faster than in the field of communication, therefore it is likely that this problem will become more dominant will intensify in the future.

The presently disclosed subject matter thus includes a method and system configured for enabling using a high resolution imaging assembly for surveying large areas as well as for tracking objects within the surveyed area, notwithstanding the bandwidth limitation of the communication link described above.

According to an aspect of the presently disclosed subject matter there is provided a surveillance system comprising: a sensing unit configured to communicate over a communication link with a control unit; the sensing unit comprises a high resolution imaging assembly operatively connected to at least one processor; the high resolution imagining assembly is configured to capture a succession of high resolution images; wherein a bandwidth of the communication link is not sufficiently large to allow transmission of the high resolution images in a desired transmission rate;

the processor is configured to: generate degraded images from respective images in the succession of high resolution images; and transmit successively sensing-data to the control unit;

the sensing-data comprising the degraded images and data indicative of one or more objects of interest in the degraded images; wherein the degraded images are suitable to be transmitted over the communication link in the desired transmission rate;

the processor is further configured, responsive to control-data received from the control unit, indicative of at least one selected element, to:

identify a location of the selected element in recently captured high resolution images in the succession of high resolution images; extract respective high-resolution image-segments from images in the succession of high resolution images, the image-segment comprising at least the selected element; and transmit successively the respective high-resolution image-segments to the control unit; wherein the high-resolution image-segments are suitable to be transmitted over the communication link in the desired transmission rate.

In addition to the above features, the method according to this aspect of the presently disclosed subject matter can optionally comprise one or more of features (i) to (xxii) below, in any desired combination or permutation:

(i). wherein the at least one processor is configured to identify one or more objects of interest in the high resolution images, assign a respective object-tag to the one or more objects of interest to yield one or more tagged-objects; wherein the sensing-data further comprises the object-tags.

(ii). wherein the control data further includes command instructions and wherein the at least one processor is configured to execute the command instructions only if the high-resolution image-segments are validated at the control unit.

(iii). wherein the at least one processor is further configured to successively transmit to the control unit, at a degraded frame rate, the succession of high resolution images.

(iv). wherein the control data further includes command instructions for executing a track command instructing to track one or more given objects; wherein the high-resolution image-segments are extracted from images in the succession of high resolution images according to the current location of the one or more given objects in the images from the succession of high resolution images.

(v). wherein the at least one processor is further configured to transmit successively to the control unit, both the degraded images and high resolution image-segments of respective high resolution captured images; wherein a degraded image and a high resolution image-segment generated from the same high resolution image are displayed as a merged image, wherein the image-segment is displayed in high resolution while the area surrounding the image-segment is displayed in degraded resolution; and wherein the location of the image-segment with respect to the degraded image is adapted according to a current location of a selected element.

(vi). wherein the at least one processor is further configured to transmit successively to the control unit, both the degraded images and high resolution image-segments of respective high resolution captured images; wherein each one of a degraded image and a high resolution image-segment generated from the same high resolution image are displayed separately on a different display device.

(vii). wherein the objects of interest are moving objects and the sensing unit is configured to identify one or more moving objects in the succession of high resolution images.

(viii). wherein the sensing unit further comprises a Video Motion Detection module configured to identify the one or more moving objects.

(ix). wherein the identification of a location of the selected element comprises:
determining whether the at least one selected element is a moving object or a stationary object; in case the at least one selected element is a moving object, obtaining from the control data an object-tag corresponding to the at least one selected object, and identifying the at least one selected object in the succession of high resolution images; in case the at least one selected element is a stationary object, obtaining from the control data an image or piece thereof, matching the image or part thereof to one or more recently captured high resolution images in the succession of high resolution images and identifying the at least one selected object in the succession of high resolution images.

(x). wherein a tagged-object is associated with its respective object-tag based on information indicative of a location of the tagged-object in the succession of images; wherein the sensing unit is further configured to trace the tagged-object, from an earlier image in the succession of images to a later image in the succession of images, thereby maintaining a given object-tag associated with a respective tagged-object along the succession of images.

(xi). wherein the sensing unit is configured to continuously send a stream of degraded images generated from the succession of high resolution images to the control unit.

(xii). wherein information with respect to the one or more objects and respective object-tags is stored in a data-repository associated with the sensing unit.

(xiii). wherein the system further comprises the control unit; the control unit being configured to: receive a degraded image from the sensing unit; display the degraded image on a display device; determine, responsive to selection of an object in the image, whether the selected object is a moving object or a stationary object;
in case the selected object is a moving object, identifying an object-tag assigned to the selected object and generating control-data comprising the object-tag;
in case the selected object is a stationary object, generating control-data comprising the image or part thereof; and sending the control-data to the sensing unit.

(xiv). wherein the control unit is configured to display the object-tags over the degraded image.

(xv). wherein the control unit is configured to: successively receive, both the degraded images and high resolution image-segments of respective high resolution captured images; display the degraded image and a high resolution image-segment generated from the same high resolution image as a merged image, wherein the image-segment is displayed in high resolution while the area surrounding the image-segment is displayed in degraded resolution; and adapt the location of the image-segment with respect to the degraded image according to a current location of a selected element.

(xvi). wherein the system is configured to execute a command with respect to the selected object notwithstanding a time-delay between a time when the sensing unit acquires the image with the selected object, to a time when a corresponding command is received at the sensing unit with respect to the selected object.

(xvii). wherein the sensing unit is located on an airborne vehicle.

(xviii). wherein the high resolution images comprise between dozens of Mega pixels and up to Giga pixels and wherein video stream rate is characterized at a rate of at least 20 frames per second.

(xix). wherein the degraded image is characterized by degraded resolution as compared to the respective high resolution images.

(xx). Wherein the degraded images are characterized by degraded color information as compared to the respective high resolution images.

(xxi). wherein the desired transmission rate is video streaming transmission rate.

(xxii). Where the system further comprises a display unit operatively connected to the at least one processor; the display device comprising a scroller configured to enable an operator to jump between different elements which are displayed in the degraded images.

According to another aspect of the presently disclosed subject matter there is provided a method of surveying an area, using a sensing unit configured to communicate over a communication link with a control unit; the sensing unit comprising a high resolution imaging assembly operatively connected to at least one processor; the method comprising:

capturing a succession of high resolution images; wherein a bandwidth of the communication link is not sufficiently large to allow transmission of the high resolution images in a desired transmission rate;

with the help of the processor performing at least the following:

generating degraded images from respective images in the succession of high resolution images, where a degraded image is characterized by degraded resolution; and transmitting successively sensing-data to the control unit; the sensing-data comprises the degraded images and data indicative of one or more objects of interest in the degraded images; wherein the degraded images are suitable to be transmitted over the communication link in the desired transmission rate;

responsive to control-data received from the control unit, indicative of at least one selected element:

identifying a location of the selected element in recently captured high resolution images in the succession of high resolution images;

extracting respective high-resolution image-segments from images in the succession of high resolution images, the image-segment comprising at least the selected element; and transmitting successively the respective high-resolution image-segments to the control unit; wherein the high-resolution image-segments are suitable to be transmitted over the communication link in the desired transmission rate.

According to another aspect of the presently disclosed subject matter there is provided a non-transitory program storage device readable by a computer, tangibly embodying a program of instructions executable by the computer to perform a method of surveying an area; the method comprising:

obtaining a succession of high resolution images captured by a high resolution image assembly; generating degraded images from respective images in the succession of high resolution images, where a degraded image is characterized by degraded resolution; transmitting successively sensing-data to a remote computer over a communication link; the sensing-data comprising the degraded images and data indicative of one or more objects of interest in the degraded images; wherein the degraded images are suitable to be transmitted over the communication link in a desired transmission rate; responsive to control-data received from the remote computer, indicative of at least one selected element:

identifying a location of the selected element in recently captured high resolution images in the succession of high resolution images;

extracting respective high-resolution image-segments from images in the succession of high resolution images, the image-segment comprising at least the selected element; and transmitting successively the respective high-resolution image-segments to the remote computer; wherein the high-resolution image-segments are suitable to be transmitted over the communication link in the desired transmission rate.

According to another aspect of the presently disclosed subject matter there is provided a control unit configured to communicate over a communication link with the sensing unit mentioned above with respect to the first aspect and as described further below;

The method, the computer storage device and the control unit, disclosed in accordance with the presently disclosed subject matter can optionally comprise one or more of features (i) to (xxii) listed above, mutatis mutandis, in any desired combination or permutation.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
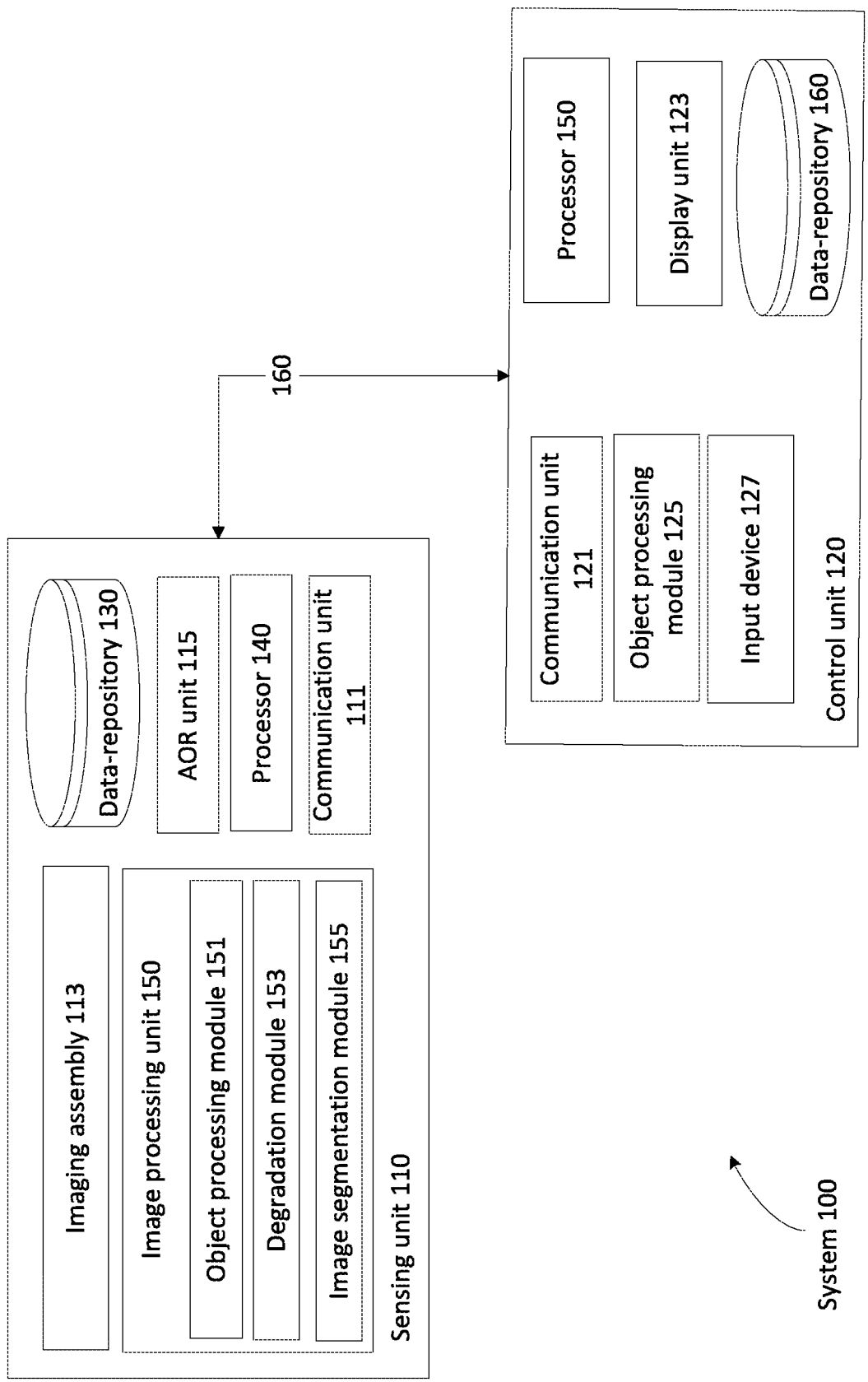
FIG. 1 is a functional block diagram schematically illustrating a surveillance system, in accordance with an example of the presently disclosed subject matter.

In the drawings and descriptions set forth, identical reference numerals indicate those components that are common to different embodiments or configurations. Elements in the drawings are not necessarily drawn to scale.

Unless specifically stated otherwise, as apparent from the following discussions, it is appreciated that throughout the specification discussions utilizing terms such as "generating", "transmitting", "identifying", "extracting" or the like, include action and/or processes of a computer that manipulate and/or transform data into other data, said data represented as physical quantities, e.g. such as electronic quantities, and/or said data representing the physical objects.

The term "computer" should be expansively construed to cover any kind of electronic device with data processing capabilities, including, by way of non-limiting example, a personal computer device, a server device, a computing system, a communication device, a processor (e.g. digital signal processor (DSP), a microcontroller, a field programmable gate array (FPGA), an application specific integrated circuit (ASIC), etc.), any other electronic computing device, and or any combination thereof. Each one of the sensing unit and the control unit described herein with reference to FIG. 1 include or is otherwise associated with one or more computers.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination. For example, FIG. 1 describes processing unit 150 configured to execute various image processing operations. Presenting a single processing unit is done for the sake of clarity and simplicity only and it should be clear to any person skill in the art that a plurality of separate processing units, each configured for executing different tasks, can be used as well.

In embodiments of the presently disclosed subject matter, fewer, more and/or different stages than those shown in FIGS. 2a, 2b, 5, 6 and 7 may be executed. In embodiments of the presently disclosed subject matter one or more stages illustrated in FIGS. 2 and 5 to 7 may be executed in a different order and/or one or more groups of stages may be executed simultaneously. FIG. 1 illustrates a general schematic of the system architecture in accordance with an embodiment of the presently disclosed subject matter. Functional elements in FIG. 1 can be made up of any combination of software and hardware and/or firmware that performs the functions as defined and explained herein. Functional elements in FIG. 1 may be centralized in one location or dispersed over more than one location. In other embodiments of the presently disclosed subject matter, the system may comprise fewer, more, and/or different functional elements than those shown in FIG. 1.

The term "criterion" as used herein should be expansively construed to include any compound criterion, including, for example, several criteria and/or their logical combinations.

The term "successively transmitted", "successive transmission" "succession of data" or any variations thereof should be expansively construed to include the transmission of data over a communication link where a sequence of data (e.g. captured images) which is obtained at one location is transmitted to another location, such that the order in which the data was generated at one end can be reconstructed at the other end.

The term "images" should be expansively construed to cover any type of stills images or images combined into a video stream. These images can come from an electro-optic sensor which can provide for example, color optical images, black and white optical images, as well as images generated by any other types of imaging system.

Attention is now drawn to FIG. 1 showing a functional block diagram schematically illustrating a surveillance system, in accordance with an example of the presently disclosed subject matter. FIG. 1 shows surveillance system 100 comprising sensing unit 110 and control unit 120 communicating over communication link 160. Sensing unit 110 and control unit 120 can be located remotely from each other. For example, control unit 120 can be located on the ground while sensing unit 110 is located onboard an airborne vehicle or device such as a manned or unmanned aerial vehicle (UAV), in a satellite, etc. In other examples, sensing unit 110 can be located at a remote location such as a manned or an unmanned ground vehicle, a manned or an unmanned vessel, a high pole etc. Communication between sensing unit 110 and control unit 120 can be facilitated for example, with the help of communication module 111 in sensing unit 110, and communication module 121 in the control unit 120. Communication between sensing unit 110 and control unit 120 can be realized by any suitable communication infrastructure and protocol known in the art.

According to the teaching disclosed herein, sensing unit 110 further comprises imaging assembly 113, image processing unit 150 and data-repository 130. Imaging assembly 113 comprises a high resolution sensor and a lens assembly with a suitably wide FOV and suitable angular resolution for capturing wide angle and high resolution images of a surveyed scene.

Image processing unit 150 is configured to execute various image processing operations including for example, object detection and tagging (e.g. with the help of object processing module 131), image degradation (e.g. with the help of image degradation module 133) and image-segmentation (e.g. with the help of image-segmentation module 135). A more detailed description of the image processing operations is disclosed below in more detail. Image processing unit is configured as part of or operatively connected to at least one computer (comprising one or more computer processors 140 and computer memory) configured to execute the relevant operations.

Control unit 120 comprises display unit 123 comprising one or more display devices (e.g. LED screens) for displaying received sensing-data; input device(s) 127, including for example, joystick, a mouse, a touch pad, touch screen or any other device enabling operator-interaction with control unit 120; and object processing module 125 configured to enable identification and tracking of object of interests in the scene.

Figure 2A:
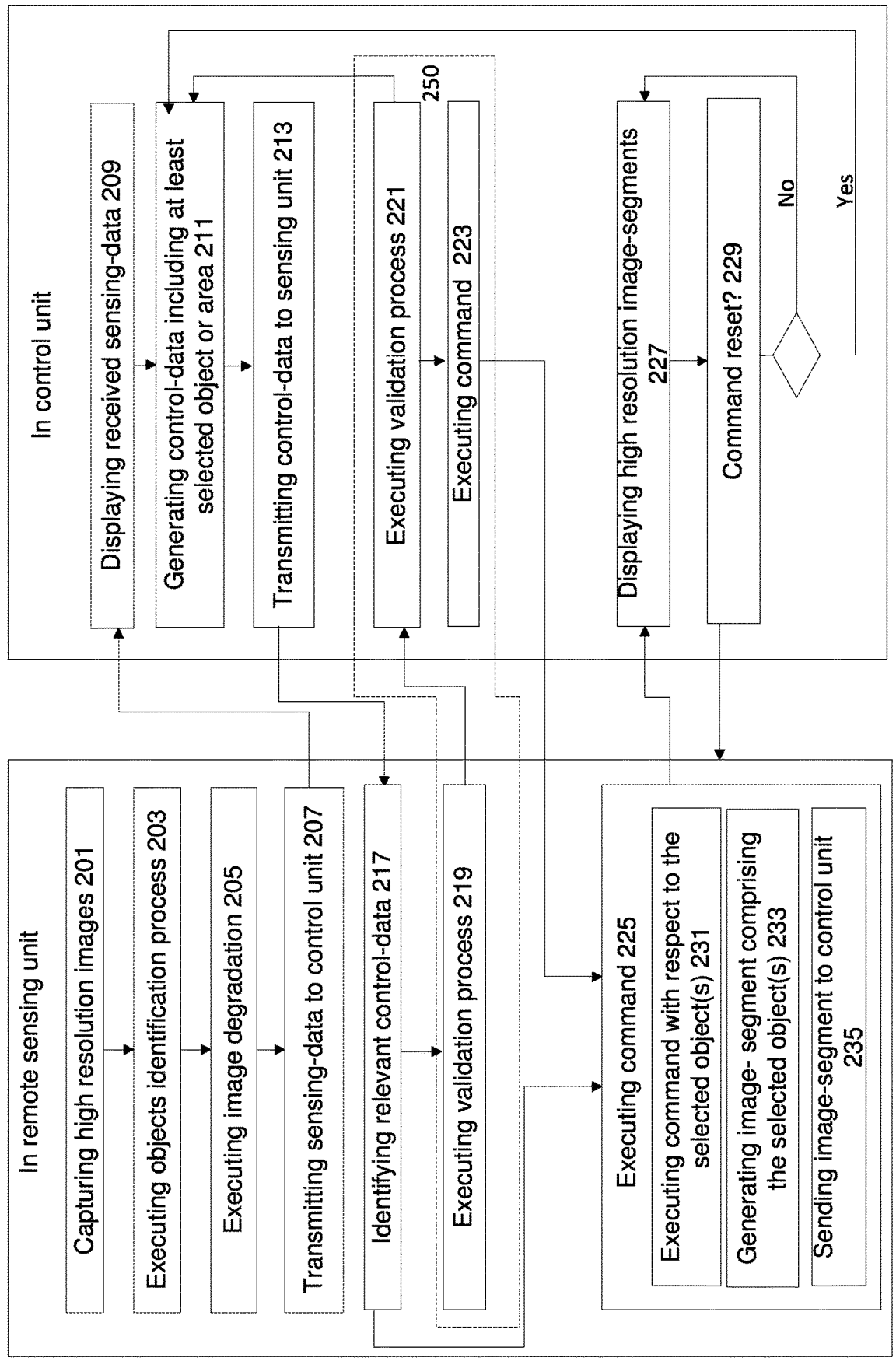
FIG. 2a is a flowchart illustrating operations performed by a surveillance system, in accordance with an example of the presently disclosed subject matter.

FIG. 2a is a flowchart illustrating operations performed by a surveillance system 100, in accordance with an example of the presently disclosed subject matter. Operations described with reference to FIG. 2a as well as FIGS. 2b, 5, 6 and 7 below, can be executed, for example, with the help of a surveillance system configured according to the principles of system 100 described above with reference to FIG. 1. It is noted however that any description of operations which is made with reference to elements in FIG. 1 is done by way of example and for the purpose of illustration only and should not be construed as limiting in any way.

An imaging assembly acquires high resolution images of a surveyed scene (block 201). The generated high resolution images are processed by image processing unit 150. According to one example image processing unit 150 is configured to execute an object identification process (block 203). During the object identification process, objects of interest are identified in the high resolution image of the surveyed scene. The identified objects of interest are tagged, each object of interest with a respective object-tag enabling its identification.

The tagged-objects are traced from an earlier image to a later image along a succession of captured images, thereby maintaining each object-tag associated with its respective tagged-object along the succession of images and enabling to track tagged-objects from one image to the next along the succession of images. A more detailed description of the object identification process is disclosed below with reference to FIG. 5.

It is noted that the term "object" as used herein should be broadly interpreted to include any type of identifiable object in an image of a scene or part thereof, including a specific type of object in an image of a scene (e.g. car, building, aircraft etc.) as well as a discernible group of one or more pixels (e.g. a group of moving pixels or a group of pixels characterized by a discernible temperature or color with respect to the surrounding scene) or an area selected in an image of the surveyed scene. In the following description the term "element" is also likewise used occasionally to refer collectively to objects or areas. An object-tag can be any number, name, character, insignia, icon etc. which can be assigned to an object and used for identifying the object.

In the following discussion an object assigned with a tag is referred to as a "tagged-object". The image, the object-tags of the tagged-objects, and possibly additional object-data can be stored in data-repository 130 (comprising for example some type of non-transitory computer memory). The term "object-data" includes various characteristics of objects, including for example, coordinates with respect to the acquired image and/or coordinates with respect to global position of the object, object's velocity, object's size, object's temperature, object's color, object's shape, correlation data and any information which may help in the identification of an object within a given image.

At block 205 an image degradation process is executed. To this end, image processing unit 150 can be further configured to process an originally captured high resolution image and generate a respective degraded image. Degradation is adapted according to the available bandwidth of the communication link for enabling transmission of the captured images to the control unit over the communication link at a sufficient rate. The original high resolution image can be degraded by implementing any one or more of available degradation methods. For example, the degradation process can be adapted to ensure that a sensing-data can reach the control unit at an acceptable rate for video streaming display (e.g. 25-30 FPS).

For example, the degradation process can include generating a degraded image which is characterized by degraded resolution compared to the originally captured high resolution image. Degradation is adapted for reducing the image resolution, and thus the image size, for enabling transmission of the captured images to the control unit over the communication link at a sufficient rate.

Alternatively or additionally, the degradation process can include degrading the frames' transmission rate. According to this approach, the high resolution image can be transmitted as a still image at a lower transmission rate (e.g. one frame every second or even slower, instead of 25 or 30 frames per second).

Further alternatively or additionally, the degradation process can include degrading the color information of the original high resolution image. According to this approach, the degraded image comprises fewer colors (e.g. black and white only) than those which are found in the original high-resolution image.

Notably, the degradation methods described herein are brought as non-limiting examples and additional degradation techniques are contemplated within the scope of the presently disclosed subject matter.

At block 207 sensing-data is transmitted to control unit 120 over a communication link. According to one example, sensing-data which is transmitted to control unit 120 includes the degraded image, one or more object-tags assigned to objects of interest identified in the captured image, and possibly also additional object-data with respect to the tagged-objects. The additional object-data can include for example, correlation data which enables to associate an object-tag with a respective object in an image in the succession of images (e.g. an image ID identifying each captured image and/or their respective coordinates in the image and their size). Notably, objects-tags can be sent in parallel to the degraded image, where the object-tags are associated with the respective tagged-objects at the control unit.

For the purpose of providing a continuous video feed of the surveyed scene, images can be continuously captured and processed at the sensing unit and the generated sensing-data can be continuously transmitted to the control unit.

At block 209 sensing-data is received at control unit 120 and can be displayed on one or more display devices in display unit 123. Sensing-data can also be stored in data-repository 160.

Notably, the image which is displayed on the control unit display is characterized by degraded resolution and therefore does not necessary provide a highly detailed and clear image of the surveyed scene. However, according to one example, the image degradation can be executed while maintaining a sufficient image resolution to allow an operator to identify the existence of objects within the image as well as to identify the types of objects which appear in the image.

Furthermore, according to another example, the object-tags can also be displayed over the degraded image to indicate the location of each respective object in the received image. Thus, objects of interest which appear in the displayed image can be recognized based on their associated object-tags, notwithstanding the reduced image resolution. Assuming for example a convoy of vehicles is traveling along a road, at least part of the vehicles in the convoy can be identified by respective object-tags which identify the entire convoy as a group of objects-tags advancing along the road.

Figure 3:
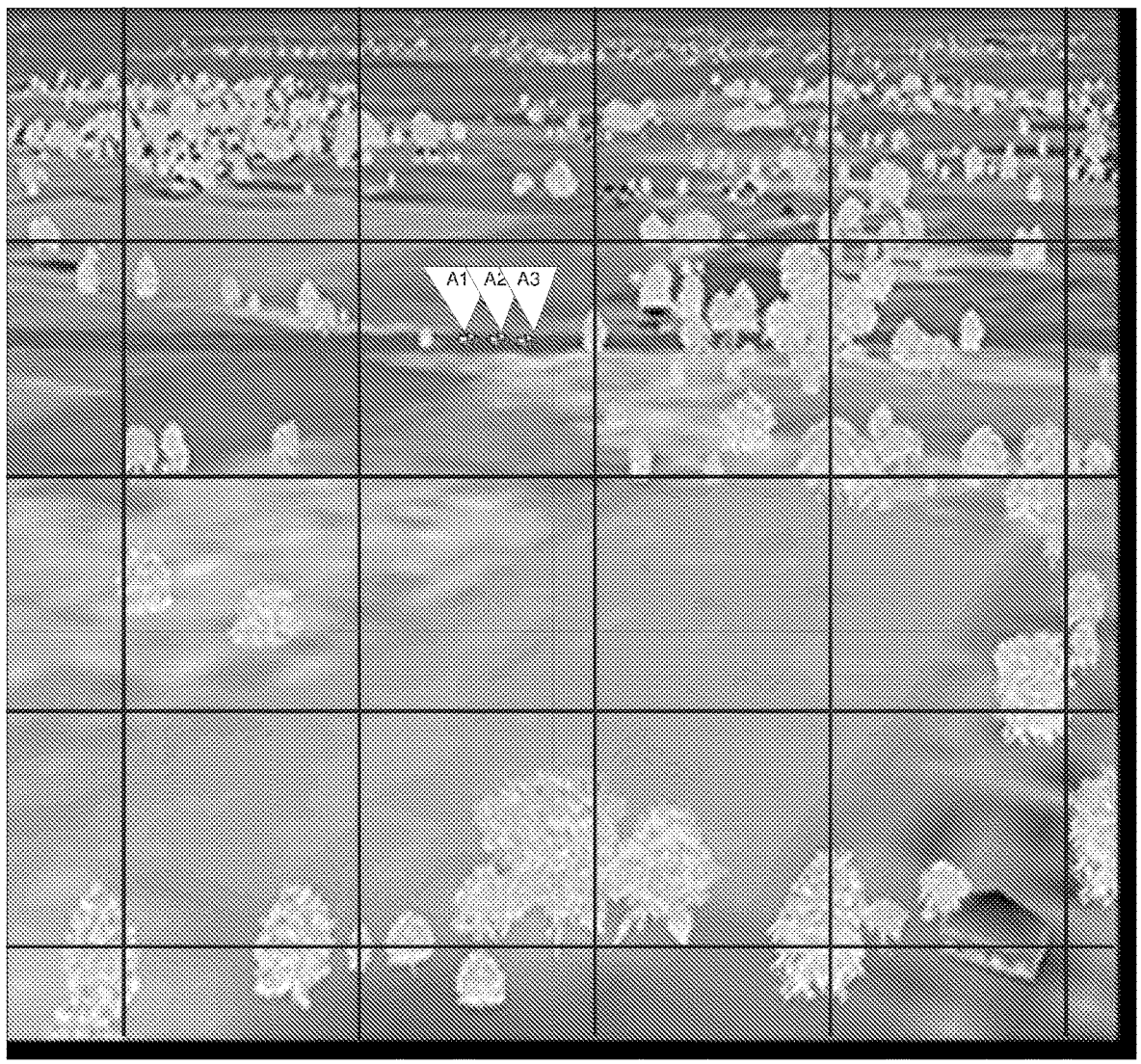
FIG. 3 is a schematic illustration of a captured image demonstrating some principles, in accordance with an example of the presently disclosed subject matter.

FIG. 3 is a schematic example of a captured image demonstrating a degraded image with a convoy of 3 vehicles traveling on a road. The object-tags assist in the identification and tracking of the vehicles in the displayed video stream. It should be noted that FIG. 3 is merely an illustrative example and the actual image may be different e.g. the resolution of the image may be less degraded or more degraded than it appears in the illustration. As mentioned above, degradation rate depends, inter alia, on a desired transmission rate and on the available bandwidth of the communication link between units 110 and 120.

Control-data can be generated at control unit 120 (block 211). According to one example, a control unit operator can select one or more objects (hereinafter "selected object") in an image displayed at control unit 120. Alternatively or additionally, an operator can indicate or select an area of interest within the displayed image.

Optionally, display unit 123 can be configured to assist the operator to view and select elements in a displayed image. For example, display unit 123 can be configured with a designated scroller configured to enable scrolling between different elements in the displayed image. By scrolling the scroller, the focus is shifted from one element to next. Once an element is in focus, the operator can easily select that element e.g. by pressing a designated button or clicking the mouse.

The scroller can be implemented as a physical scrolling device such as a turning knob or wheel (e.g. a designated wheel or mouse wheel) where turning of the knob or wheel causes the focus to shift from one element to the next in the image. Alternatively or additionally, the scroller can be implemented as a virtual scroller implemented by software and displayed on the screen alongside the displayed images. For example, a scroll bar which can be moved with the help of the arrow keys in a keyboard or mouse cursor. Moving the scroll bar causes the focus of the focus to shift from one element to the next in the image.

The scroller can also include appropriate software configured to be responsive to interaction with the scroller and generate an indication showing which element is currently is in focus and/or which elements has been selected. For example, an element in focus can be colored in a certain color or be marked by a square or circle surrounding the element. As the operator scrolls from one element to the next, the indication (e.g. specific coloring) is shifted from one element to the next to indicate which element is currently in focus.

Responsive to the operator selection, control-data is generated by control unit 120. According to one example, control-data includes a selected object(s) or a selected area. According to another example, control-data may also include some type of command issued with respect to the selected object or selected area.

Different types of commands can be generated with respect to an object including for example, command to lock and track a selected object (e.g. moving object), command to zoom in on a selected object, command to mark a selected object, command to obtain data with respect to a certain parameter (e.g. velocity) of a selected object, etc. An object can be selected by any way known in the art for example, by pointing or otherwise marking an object of interest with the help of an input device 127.

Other types of commands which are not necessarily associated with an object can also be generated. For example, a virtual zoom command instructing sensing unit to transfer a selected area in the captured image with maximum quality, i.e. with no degradation on the video stream. A zoom command may include pointing instructions, indicating the desired area of interest and a zoom command instruction to zoom e.g. avoid degradation of the indicated area in the image.

A more detailed description of a command generation process according to an example of the presently disclosed subject matter is described below with reference to FIG. 6. The generated control-data is transmitted back to sensing unit 110 (block 213).

The control-data is received by sensing unit 110 (block 215) and the selected object(s) or area(s) are identified by sensing unit 110 in a more recently captured high resolution image (block 217). In some examples the selected objects are identified in the most recently captured high resolution image that is available for processing at the time the control-data is received. Methods of identifying the selected elements (e.g. object(s) or area(s)) are discussed below.

Optionally, a data validation process 250 can be executed (process 250). As the operator selection is done while viewing an image with degraded resolution, it is desirable to validate the selection in order to avoid selection errors (e.g. selecting the wrong object). Furthermore, the operator may wish to quickly examine different elements in the scene more closely. Thus the validation process provides the operator with opportunities to change the selection before executing commands.

Figure 2B:
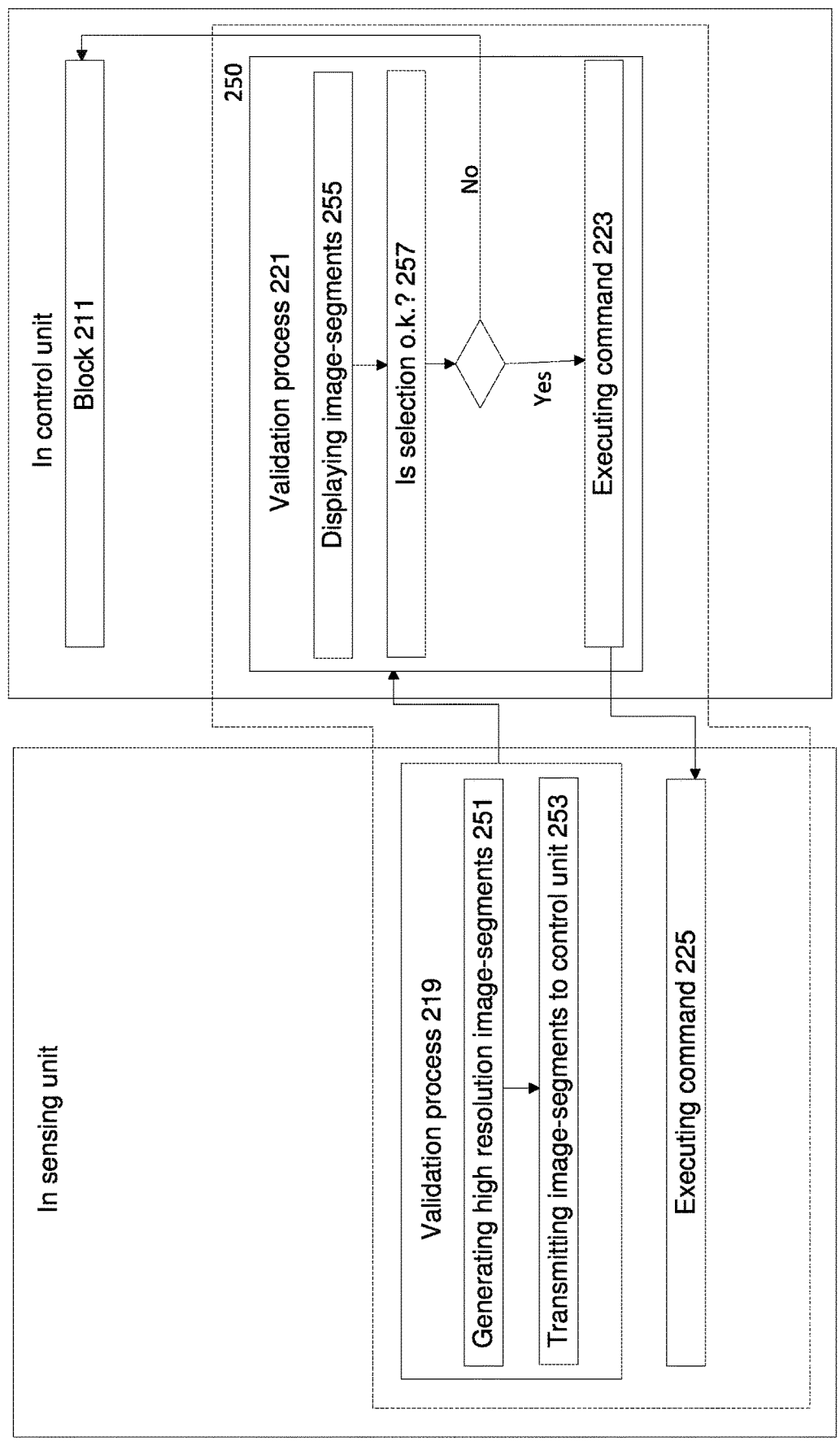
FIG. 2b is a flowchart illustrating operations performed during the data validation process, in accordance with an example of the presently disclosed subject matter.

FIG. 2b is a flowchart illustrating operations performed by a surveillance system during a data validation process, according to examples of the presently disclosed subject matter. During the validation process, the high resolution image is cropped to obtain a high resolution image-segment which comprises the selected object(s) or area (block 251). The high resolution image-segment is then transmitted to control unit 120 (block 253) where it is received and displayed (block 255). Notably, the size of the image-segment is selected to match a desired transmission rate and may depend on the available bandwidth of the communication link between units 110 and 120. As mentioned above, for the purpose of providing a continuous video feed of the surveyed scene, image-segments are continuously generated and transmitted to the control unit.

The operator can then view the selected object(s) or selected area in the high resolution image-segment and examine the displayed information more closely. Due to the high resolution quality of the image-segment, it can be displayed on a suitably large display device for conveniently viewing the displayed information. It is then determined whether the displayed information meets the approval of the operator or not (block 257).

If the displayed information does not meet the operator's approval the process can be reset. In response, the operator can be allowed to re-select a different object(s) or area (return to block 211). Optionally, responsive to a reset operation, a suitable command can be sent to sensing unit instructing to halt further generation and transmission of image-segments of the previously selected element.

If, however, the operator determines that the information displayed in the image-segment meets with his approval, the image-segment can be validated (e.g. by a designated operation of the operator). Following validation, a respective command can be executed with respect the selected object(s) or area (block 223 in FIG. 2).

In the event that a command has been issued earlier (e.g. during generation of the control-data at block 211), the respective command instructions can be sent to the sensing unit and/or (if instructions have already been sent) executed at the sensing unit. Otherwise, a command can be issued after validation of the displayed image-segment and then the respective command instructions can be sent to the sensing unit and executed. According to one example, the operator can validate the displayed image-segments by issuing a respective command or by sending instructions to the sensing unit to execute a previously issued command.

During execution of the command (block 225) sensing unit 110 is configured to execute the command instructions with respect to the selected element(s) e.g. selected object(s) or area (block 231). Sensing unit 110 is further configured to crop a succession of high resolution images as they are captured and generate image-segments comprising the selected elements (block 233). The image-segments are successively transmitted to the control unit (block 235) where they are displayed for viewing by the operator (block 227).

Consider, for example, a lock and track command instructing sensing unit 110 to lock on a certain moving vehicle and track the vehicle as it travels. Optionally, if necessary, the image sensor is directed to point in the direction of the selected object (e.g. executing a centering command). The high resolution image is cropped to obtain a high resolution image-segment comprising the selected vehicle and possibly some of the area around the vehicle. The image-segment is then transmitted to the control unit where it is displayed on a display device. As the sensing unit continues to track the selected vehicle, it continues to generate and transmit to the control unit 120 image-segments comprising the selected vehicle (or vehicles).

Figure 4A:
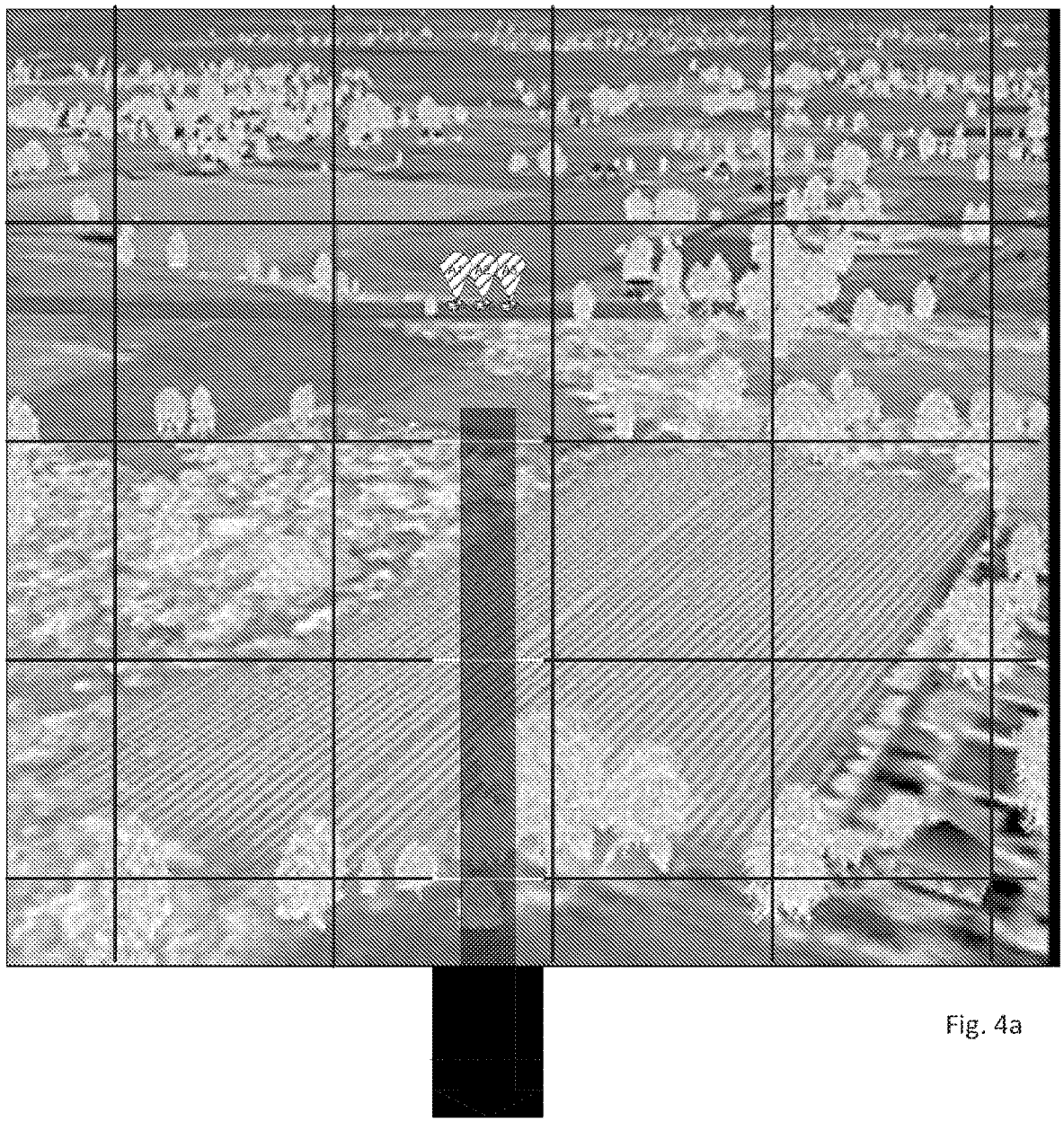
FIGS. 4a and 4b are schematic illustrations of captured images demonstrating some principles, in accordance with an example of the presently disclosed subject matter.
Figure 4B:
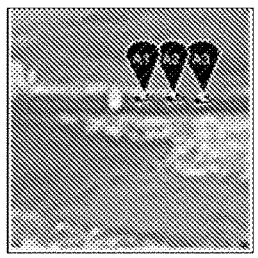

As schematically demonstrated in FIGS. 4*a* and 4*b*, according to one example, the original high resolution image can be segmented into a plurality of segments. As the vehicle travels, it may traverse different areas in the originally captured high resolution image. Sensing unit 110 can be configured to continuously track the moving vehicle and send to control unit different image-segments depending on the current location of the vehicle in the originally captured high resolution image. This procedure allows sensing unit to utilize a high-resolution imaging assembly for tracking a moving object while reducing (and sometimes completely avoiding) the need to move the imaging assembly during tracking.

If an object(s) or area of interest moves (or is about to move) out of frame, the sensing unit is configured to reposition the sensor in order not to lose sight of the selected object(s) or area.

Likewise, in the event of a zoom command, instructing the sensing unit 110 to zoom on a selected object(s) (for example a stationary object) or a selected area, optionally, if necessary, the image sensor is directed to point in the direction of the selected object (e.g. for centering the selected object or area) and a desired zoom effect (either virtual (i.e. by avoiding degradation) or real (using zoom lens)) is provided by the image sensor. As before, the high resolution image is cropped to obtain a high resolution image-segment comprising the selected object (or area) and possibly some of the area around the object. The image-segment is then transmitted to the control unit where it is displayed on a display device. The sensing unit can continue to generate and transmit to the control unit 120 image-segments comprising the zoomed element.

At block 229, the operator can reset the issued command (return to block 211) and select a different object(s) or a different area.

According to another example, degraded image-segments and high resolution image-segments are merged and displayed as a single image. In the merged image, the image-segment is displayed in high resolution while the area surrounding the image-segment is displayed in degraded resolution. If the position of an object(s) of interest (or area of interest) changes with respect to the entire area which is being captured, the area of the image-segment which is displayed in high resolution format changes according to the object's movement.

As mentioned above, another optional solution to the problem of transmission bandwidth limit when using a high resolution imaging assembly is to reduce the frame rate in which the images are being transmitted. According to this approach, images which are being transmitted are not necessarily degraded but rather the frame rate of image transmission over the communication link between the sensing unit and the control unit is adapted to the available bandwidth. The high resolution images (and the objects-tags) which are received at the control unit are displayed on a display device 123. A display device suitable for displaying high resolution images can be used having a suitable pixel resolution and suitably large dimensions. The refresh rate of the displayed high resolution image is in correlation with the reduced frame rate, and, accordingly, it may not provide a complete video streaming effect.

According to a further example, both a high rate video streaming of degraded images and a reduced rate of high resolution images can be transmitted and displayed on the display unit 123. In such cases, image degradation and reduced frame rate are adapted to enable the transmission of both types of images over the communication link. Display unit 123 may include at least one display device suitable for displaying the degraded video stream and at least one display device suitable for displaying high resolution images which are transmitted at a reduced rate. Object tags can be displayed in both type of images and assist in associating between objects which are seen in the two types of images.

One problem which is related to controlling an image sensor over a remote communication link pertains to a time-delay which exists between the time when the sensing unit acquires an image of an object, to when the image is displayed on the display located at the control unit, and further to the time the corresponding instructions are received at the sensing unit. Factors that can contribute to the delay include for example, signal processing, image compression/decompression, duration of the communication, and/or communication link bandwidth limitations. The accumulated delayed time can be from fractions of a second to several seconds.

Due to this time-delay, the location of the object as displayed on the display at the control unit is generally not the current location of the object. The location displayed on the display is the location of the object before the transfer of the sensing-data from the sensing unit to the control unit (e.g. x seconds ago). Additionally, by the time the sensing unit receives the control-data from the control unit and generates the instruction for the image sensor, an additional time-delay occurs, (e.g. an additional y seconds). Consequently, by the time image sensor is instructed to locate the object, the object may no longer be in the same location it was when the image was taken x+y seconds ago.

Clearly, this time-delay complicates the efforts to lock onto the object. The operator has to accurately estimate the expected location of the object at a time in the future when the instructions arrive at the sensing unit. Only then is the sensing unit directed to the calculated estimated location, and a lock and tracking operation can be initiated.

If the estimated location is not sufficiently accurate, the sensing unit will lock onto some other background object and the entire estimate, calculate and lock process has to be repeated. As such, the effect is a continuous feedback control loop with delay, a situation which is liable to suffer from overshoots and instability.

There are various methods which are known in the art which are directed to overcoming the aforementioned time delay problem. One solution to this problem is disclosed in U.S. Pat. No. 7,184,574 which is incorporated herein by reference in its entirety. Another solution is disclosed in PCT application, publication number WO2014/111923 filed by the Applicant of the present application. In the following discussion the solution provided in WO2014/111923 is described in the context of the presently disclosed subject matter. However, it is noted that the surveillance system disclosed herein may operate according to the principles of any one of the techniques directed for solving the time-delay problem and is not bound to one specific technique.

Figure 5:
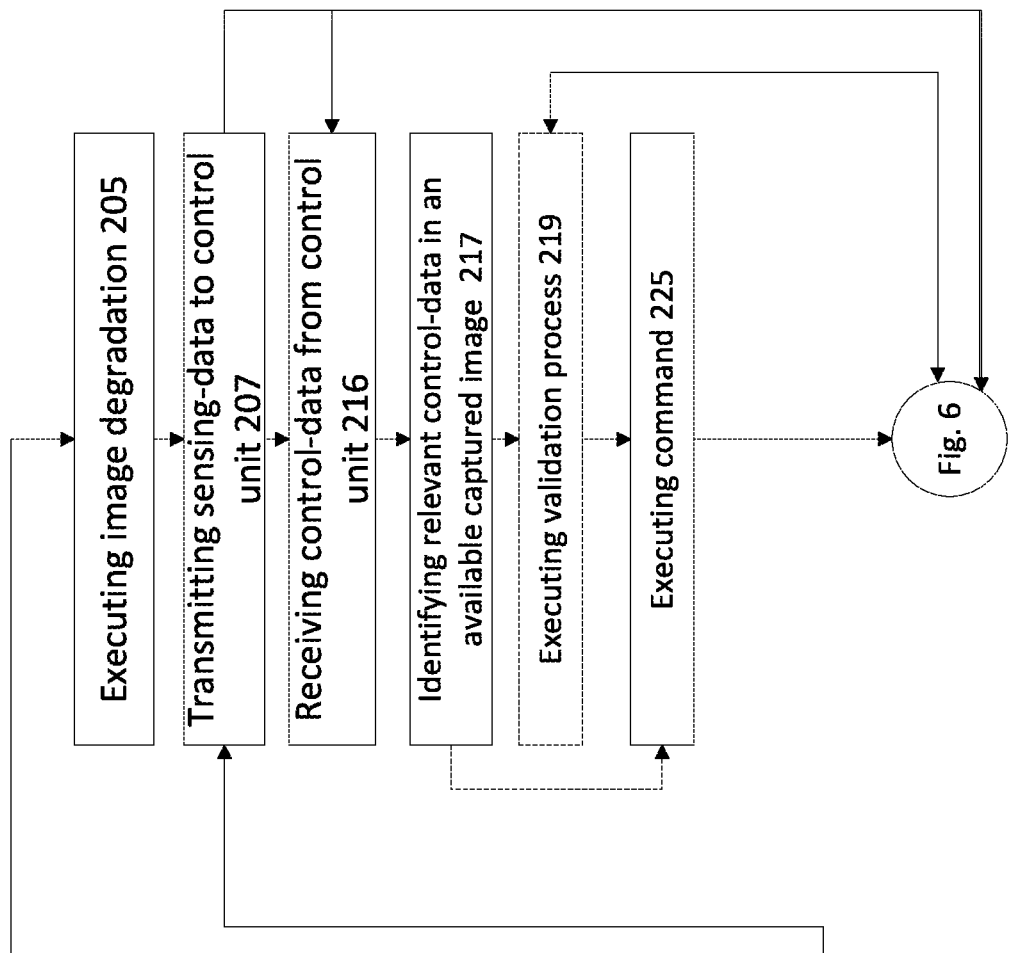
FIG. 5 is a flowchart illustrating operations performed by a sensing unit, in accordance with an example of the presently disclosed subject matter.
Figure 5:
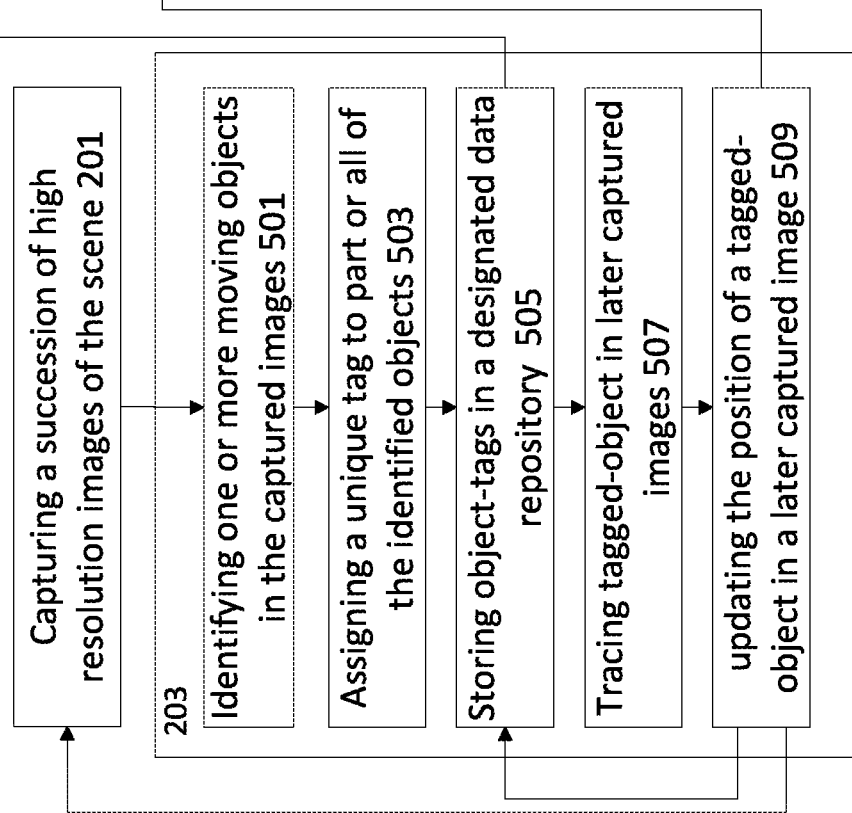

FIG. 5 is a flowchart illustrating operations performed by a sensing unit, according to an example of the presently disclosed subject matter. As described above with reference to blocks 201-203 in FIG. 2 high resolution images of a scene are captured by imaging assembly and undergo an object identification process for identifying an object of interest. Objects of interest can be defined according to different object parameters. According to one example, objects of interest include only moving objects. According to this example, during the object identification process, moving objects appearing within the captured images are identified. A respective object-tag is assigned to each one of part or all of the identified objects. The object-tag uniquely identifies each assigned moving object.

Object processing module 151 in sensing unit 110 can be configured to execute the identification process which includes tagging of moving objects. Methods of identifying moving images in a stream of images are well known in the art. For example moving objects can be identified with the help of a Video Motion Detection (VMD) algorithm. To this end, object-processing module 151 can comprise or be otherwise operatively connected to a VMD module configured to implement a VMD algorithm and identify moving objects in the succession of images.

Optionally, every moving object which is identified in the acquired images is assigned with a respective object-tag. Alternatively, not all moving objects in a scene are tagged by object-processing module 151. Rather, specific objects of interest can be selected based on different parameters. For example, specific objects can be selected with the help of a computer program configured to select objects in a scene which match some criterion. To this end, sensing unit 110 can be optionally equipped with an automatic object recognition unit (AOR) 115.

According to the presently disclosed subject matter, AOR unit 115 is configured to select objects in a scene, to be tagged with respective object-tags, based on the characteristics of the objects. The AOR unit 115 can be preprogrammed with predefined characteristics and respective criterion for selecting of sought after objects. Such characteristics and criterion can include for example, size of an object, velocity of an object, temperature emanating from an object, etc. Objects can also be screened, based on their dispersion across the image, for example, only a single object is tagged from among a plurality of identified objects within an acquired image, in case the objects are gathered together such that distance between the plurality of objects is less than a predefined distance. In the event that objects of interest include only moving object, screening can be implemented on identified moving object according to predefined characteristics. In the event that object of interest include also stationary objects, screening can be implemented on all object identified in the scene.

AOR unit 115 can be configured to obtain information indicative of moving objects in the succession of captured images (e.g. from the VMD module), analyze the received information, and determine the characteristics of moving objects in the images. AOR unit 115 can then determine whether these characteristics meet some type of predefined criterion and generate an indication accordingly. AOR unit 115 can be configured to transmit to object-tagging module 115 information indicating which of the moving objects comply with the predefined characteristics and criterion of the sought after objects. In turn, object-tagging module 115 can be configured to tag the moving object (or objects) indicated by AOR unit 115.

The object-tags assigned to the moving objects in the acquired image and optionally also object-data, can be stored in a designated data repository (block 505). For example, the data can be stored in a data structure which includes x, y coordinates indicating the position of a moving object within an acquired image i and an object-tag assigned to that object. Optionally, the acquired image can be stored as well, however this is not always necessary and in some cases previously captured images are discarded once a newer image is captured.

The position of a moving object in an earlier image is likely to change in later images due to movement of the object and/or movement of the sensing unit and/or movement of the image sensor. To this end object-processing module 151 can be further configured to receive the images captured by imaging assembly 113 and trace the tagged-objects from an earlier image to a later image along the succession of captured images (block 507), thereby maintaining each object-tag associated with its respective tagged-object along the succession of images and enabling to track tagged-objects from one image to the next along the succession of images.

For example, object procession unit 151 can be configured to trace each tagged-object from an earlier image to a later image in the succession of images captured by image sensor, and determine the position (e.g. x and y coordinates) of the moving object in the later image.

Methods for tracing objects from an earlier image to a later image along a succession of images are well known in the art and include for example the VMD algorithm which enables tracing moving objects as they are detected from one image to a sequential image. Other methods are based on center of gravity identification, edge detection, correlation etc. It is noted that as used herein the term "later" includes an image which is captured at a later time than an image captured at an earlier time (i.e. an earlier image). The term "later image" includes, but is not limited to, a consecutive image.

At block 509 it is determined whether the position of a tagged-object in the later image is different than the position of the object in the earlier image, and in case it is, the information indicating the position of the object is updated and the updated position of the object is associated with the respective object-tag (e.g. in data repository 130). During the operation of imaging assembly 113 new moving objects, which enter the FOV of image sensor, are identified and assigned with respective object-tags.

As explained above, according to one example, the originally captured high resolution image undergoes a degrading process to obtain a degraded image characterized by reduced resolution (block 205).

Sensing-data, including the degraded image and the object-tags assigned to moving objects in the degraded image, is successively transmitted (e.g. according to the order they are captured) to the control unit (block 207).

As mentioned above, sensing-data can optionally also include object-data with respect to the tagged-objects, including for example coordinates indicating the location of each tagged-object within the acquired image, and possibly other characteristics of the tagged-objects (e.g. shape, size, temperature, velocity, color etc).

Figure 6:
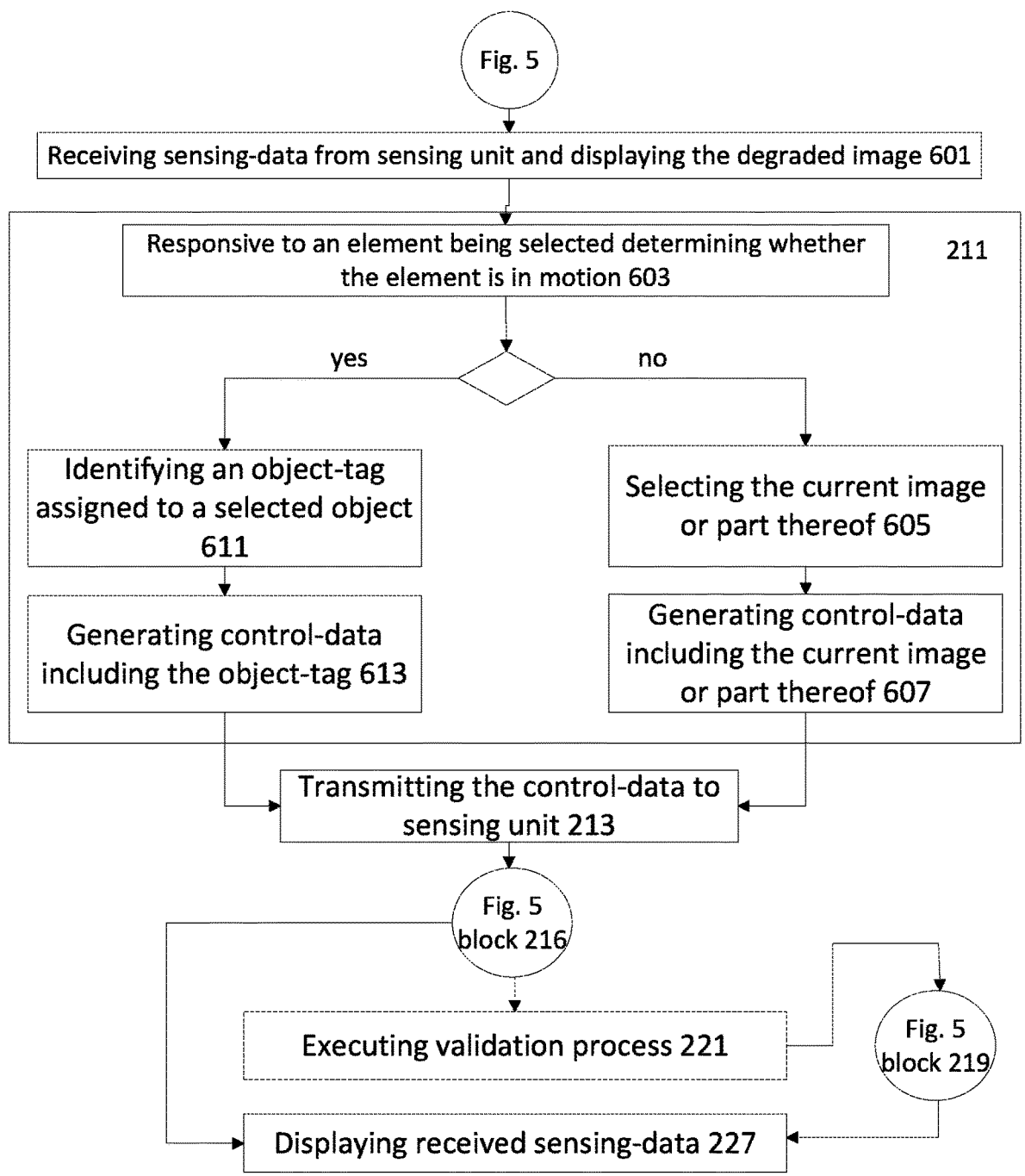
FIG. 6 is a flowchart illustrating operations performed by a control unit, in accordance with an example of the presently disclosed subject matter.

The description now turns to FIG. 6, which is a flowchart illustrating operations performed at the control unit, according to an example of the presently disclosed subject matter. Sensing-data generated at sensing unit 110 is received at the control unit (block 601). The degraded images are displayed at the control unit. If one or more moving objects are identified and tagged, the object-tags are displayed over the images at the appropriate location, indicating the location of the respective objects in the displayed image.

The objects-tags can be associated with the respective objects in the succession of images based on the location of the objects in a respective image. Thus for example, sensing-data can include, for each high resolution captured image in a succession of images, a degraded image, one or more object-tags of respective moving objects in the image, and data indicative of the location of the tagged-objects in the image.

Responsive to one or more elements (object(s) or area(s)) being selected in the control unit, an object identification process is executed (block 211). During the object identification process it is determined whether the selected element is moving or stationary (block 603). According to one example, where only moving objects are tagged by the sensing unit, this can be accomplished based on whether the selected element is assigned with a respective object-tag or not. If it is, it is identified as a moving object and if not, it is identified as a stationary object. Optionally, the sensing unit can be configured to assign a universal tag, indicating that a given object is in motion, to all identified moving objects. In such cases, it can be determined (e.g. with the help of object processing module 125) whether a selected element is moving or stationary based on this universal tag. Alternatively or additionally, control unit 120 can comprise a VMD module for identifying moving objects.

Once it is determined whether the selected element is moving or stationary, a different approach is adopted for handling each type of object. At block 605, in case it is determined that the selected element is a stationary object, the entire image in which the element was selected, is incorporated into the control-data. Alternatively, in order to reduce the size of the control-data, rather than using the entire image, a piece of the image surrounding the selected object is copied and incorporated into the control-data. The control-data can include, in addition to the copied piece of image or entire image, data indicative of the location (e.g. in x, y coordinates) of the selected element in the image. In case a piece of the image is used, coordinates, indicating the location of the selected object with respect to boundaries of the copied piece of the image, can be used.

Appropriate control-data is generated, including the entire image or the piece of the current image (block 607). For example, in case an operator selects an object viewed in the degraded image, appropriate control-data can be generated in the control unit, where the control-data includes a piece of image extracted from the currently displayed degraded image and information indicative of the location of the selected object in the copied piece of image. The generated control-data is transmitted to sensing unit 110 (block 213).

Figure 8:
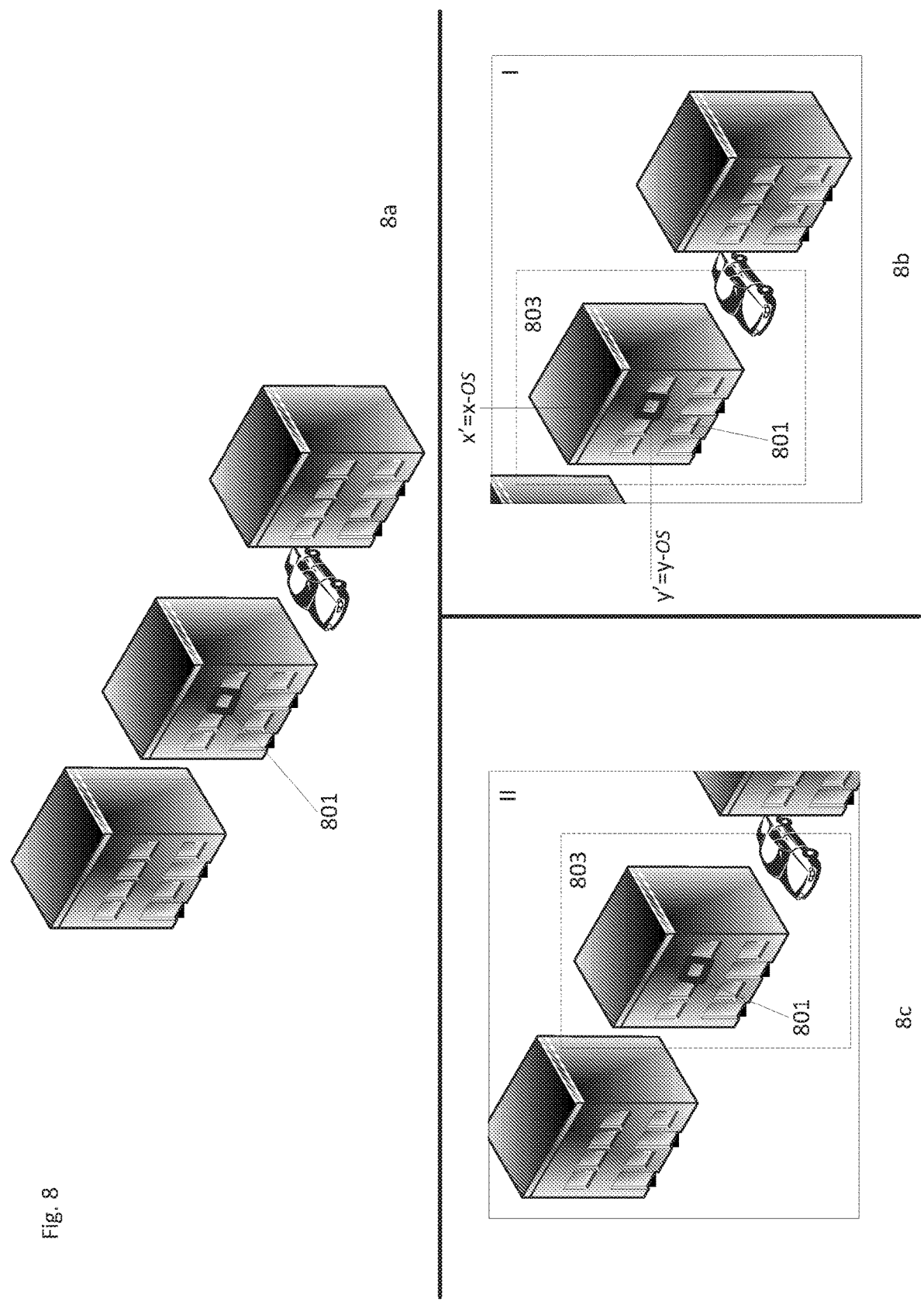
FIGS. 8a-8c are schematic illustrations exemplifying the tracking method of a stationary object, in accordance with an example of the presently disclosed subject matter.

FIG. 8a and FIG. 8c are schematic illustrations exemplifying processing a tracking command made with respect to a stationary object, in accordance with the presently disclosed subject matter. FIG. 8a shows a scene being monitored by a sensing unit. The illustrated scene includes 3 buildings and a car. FIG. 8b shows image I which is an example of an image (captured by the sensing unit) covering a portion of the scene which is being displayed at the control unit. Assuming an operator of the control unit wishes to view window 801 more closely (and possibly also to track the window), the operator selects window 801 in image I. In response to the operator's action, control unit 120 determines that the selected object is stationary and then extracts a piece of image I (803) which includes the selected window.

Control-data comprising image piece 803 along with information indicating the location of window 601 (e.g. x, y coordinates) within the image or within image-piece 803, is generated. The coordinates of the window within the copied piece 803 can be calculated by subtracting the offset (OS) of the boundaries of image-piece 803 from the coordinates of the window with respect to image I.

Reverting to block 603 in FIG. 3, in case it is determined that the selected object is a moving object, an object-tag which was assigned by the sensing unit to the selected object is identified (block 611). For example the sensing-data can include an image, one or more object-tags and the updated location of each of the respective tagged-objects within the image. This enables the control unit to associate between a selected object and its corresponding object-tag based on the location of the object within the image. In another example, object-tags can be incorporated as an overlay of the image such that object-tags can be associated to their respective objects within the image.

Control-data, including the object-tag of the selected object, is generated (block 613). For example, in case an operator selects, in the degraded image, a moving vehicle he wished to inspect more closely, control-data including the object-tag of the selected object is generated at control unit 120 (e.g. with the help of tracking module 125). The generated control-data is transmitted to the sensing unit (block 213).

Reverting to FIG. 5 control-data generated at control unit 120 is received in sensing unit 110 (block 216). Selected elements indicated in the control-data are identified in an available image (block 217). According to one example, the selected element(s) is identified in a most recent high resolution captured image available for processing. The identified elements are traced from one image to the next along the stream of captured high resolution images. A more detailed description of the object identification process is described below with reference to FIG. 7.

Optionally, a validation process is executed (block 219) as described earlier with reference to FIG. 2b. High resolution image-segments comprising the selected elements are generated and transmitted to the control unit. If the image-segments are approved during the validation process or if a validation process is not executed, an issued command is executed at the sensing unit and the relevant sensing-data received from the sensing unit is displayed at the control unit 227. As explained above, the sensing-data can include high-resolution data segments with information pertaining to the executed command. Optionally, sensing-data can also include the entire high resolution images captured by the imaging assembly, which can be transmitted at a degraded transmission rate.

Figure 7:
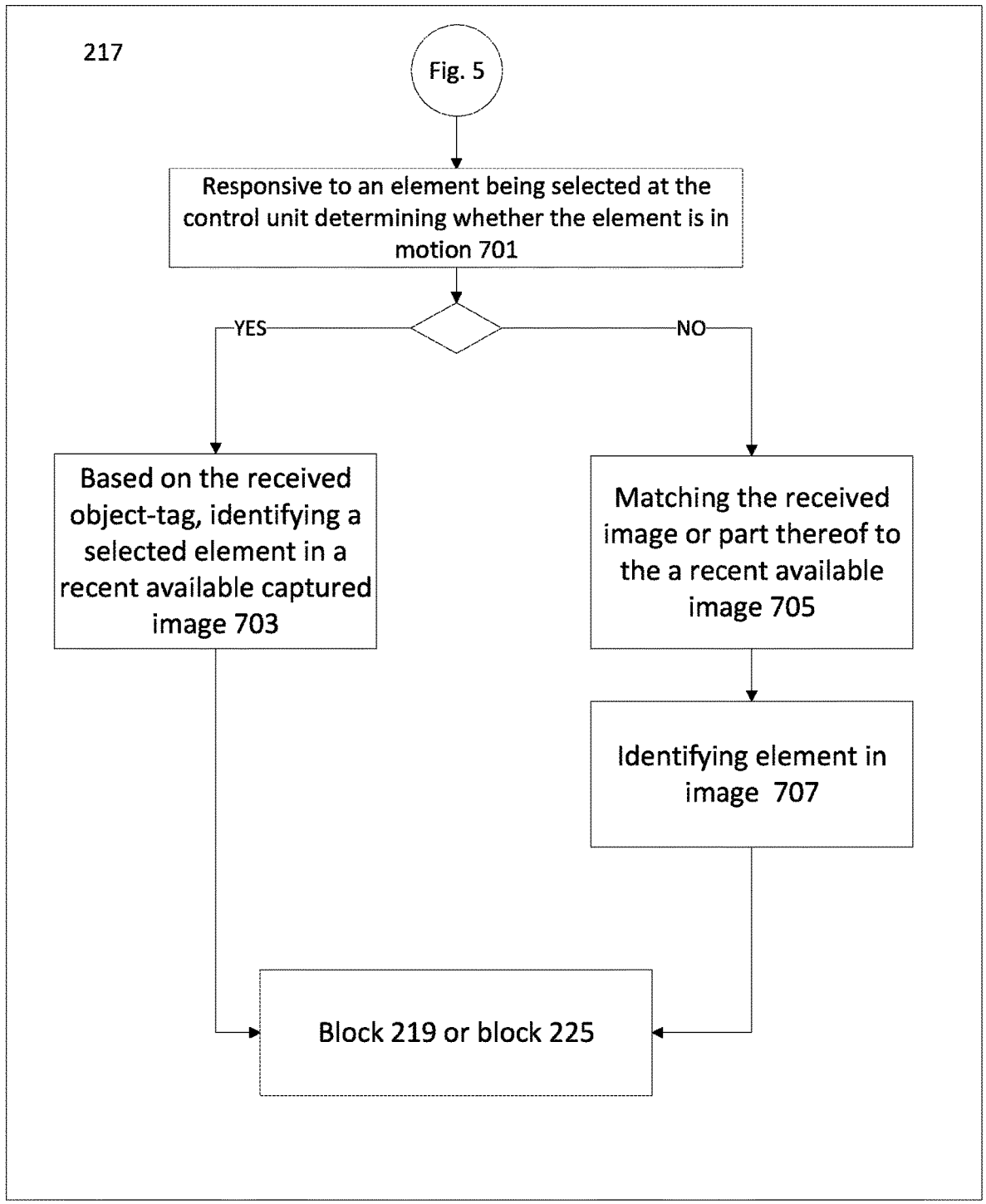
FIG. 7 is a flowchart illustrating operations performed by a sensing unit, in accordance with an example of the presently disclosed subject matter.

FIG. 7 is a flowchart illustrating a more detailed description of operations related to block 217 in FIGS. 2 and 5, according to an example of the presently disclosed subject matter. According to some examples, operations described with reference to FIG. 7 can be executed by (remote) object processing module 151 or by some other processing unit specifically configured for tracking objects.

In response to received control-data, it is determined whether selected elements indicated in the incoming control-data are moving or stationary (block 701). The received control-data includes either an object-tag (in case the control-data was generated with respect to a moving object) or a part of an image (in case the control-data was generated with respect to a stationary object). Determining whether the selected element in received control-data is moving or stationary can be based on the content of the control-data. For example, the control-data can include data indicating whether the respective selected object is stationary or in motion. Alternatively, sensing unit 110 can be configured to determine whether the respective selected element is stationary or in motion based on whether the control-data includes an object-tag or a part of an image.

If the received control-data was generated with respect to a moving object, the sensing unit is configured to locate, in a latest available captured image, the object which is identified by the respective object-tag incorporated in the control-data (block 703). According to one example, in order to identify the selected object in the latest available captured image, the sensing unit can be configured, to use the received object-tag, search data repository 130 for the object-tag, find the updated position of the respective tagged-object and use its most updated position in order to locate the tagged-object in the latest available captured image.

In response to control-data generated with respect to a stationary object, sensing unit 110 is configured to locate a selected stationary object, in the latest available captured image. The image or part thereof is extracted from the control-data of the received command. In case part of an image is received, the control-data can further include data indicating the location of the selected object in the image or the part thereof (e.g. coordinates of the object in the image or part thereof).

The image-piece (or in some cases the entire image) is matched to the most recently available captured image (block 705) so that identical regions in the two images are overlapped and thus identified. This can be accomplished for example with the help of image registration techniques which are well known in the art.

After the image-piece and the most recently available image are matched, the selected object can then be located in the most recently available image at the point which overlaps with the location of the selected object indicated in the piece of copied image (block 707).

Reverting to the example in FIG. 8a, responsive to control-data received at sensing unit 110, and assuming that the selected object was identified as a stationary object, sensing unit 110 locates image-piece 803 in the latest available captured image (image II in FIG. 9c). Note, that the image II is different than image I as it covers a different region of the scene, however Image-piece 803 still overlaps image II. Once image-piece 803 is located in image II, the location of window 801 can be found within image II based on its location within image part 803. It is noted that in some cases the piece of image (or entire image) received from with the control-data only partially overlaps the latest available captured image.

Thus, the surveillance system and method disclosed herein enables to lock and track an object selected in an image displayed at the control unit, notwithstanding a time-delay between the time the sensing unit acquired the image, to a time when the lock command is received from the control unit, at the sensing unit, with respect to the selected object.

Once the selected elements are identified, the process proceeds to execute operations according to either block 219 or block 225 as disclosed above.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable non-transitory memory tangibly embodying a program of instructions executable by the machine for executing the method of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A surveillance system, comprising:
   a sensing unit configured to communicate over a communication link with a computer device having data processing capabilities; the sensing unit comprises a high resolution imaging assembly operatively connected to at least one processor; the high resolution imagining assembly is configured to capture a succession of high resolution images comprising one or more elements; wherein a bandwidth of the communication link is not sufficiently large to allow transmission of the high resolution images at a desired transmission rate;
   wherein the at least one processor is configured to:
      generate degraded images from respective images in the succession of high resolution images and transmit successively sensing-data to the; the sensing-data comprising the degraded images and data indicative of one or more elements in the degraded images; wherein degradation is adapted according to an available bandwidth of the communication link;
   wherein the at least one processor is further configured, responsive to control-data received from the computer device, indicative of at least one selected element, to:
      identify a location of the selected element in recently captured high resolution images in the succession of high resolution images;
      extract respective high resolution image-segments from images in the succession of high resolution images, the image-segments comprising at least the selected element; and
      transmit successively the respective high resolution image-segments to the computer device; wherein the high resolution image-segments are adapted according to the available bandwidth of the communication link, thereby enabling the image-segments to be communicated at a desired transmission rate.

2. The surveillance system according to claim 1 wherein, the at least one processor is configured to identify from among the one or more elements, one or more objects of interest in the high resolution images, assign a respective object-tag to the one or more objects of interest to yield one or more respective tagged-objects; and wherein the sensing-data further comprises the object-tags.

3. The surveillance system according to claim 1 wherein the control-data further includes a track command instructing to track one or more given objects from among the one or more elements; the at least one processor is configured, responsive to the track command, to extract the high resolution image-segments from images in the succession of high resolution images according to a current location of the one or more given objects in images from the succession of high resolution images.

4. The surveillance system according to claim 3 wherein:
   the at least one processor is further configured to transmit successively to the computer device, both the degraded images and high resolution image-segments of respective high resolution captured images;
   and wherein a degraded image and a high resolution image-segment generated from a common high resolution image are displayed as a merged image, wherein the image-segment is displayed in high resolution while an area surrounding the image-segment is displayed in degraded resolution; and a location of the image-segment with respect to the degraded image is adapted according to a current location of a selected element.

5. The surveillance system according to claim 2, wherein the identification of a location of the at least one selected element comprises:

determining whether the at least one selected element is a moving object or a stationary object;

in case the at least one selected element is a moving object, obtaining from the control-data an object-tag corresponding to the at least one selected element, and identifying the at least one selected element in the succession of high resolution images; and in case the at least one selected element is a stationary object, obtaining from the control-data an image or part thereof, matching the image or part thereof to one or more recently captured high resolution images in the succession of high resolution images and identifying the at least one selected element in the succession of high resolution images.

6. The surveillance system according to claim 2, further comprising the computer device, the computer device being configured to:

receive a degraded image from the sensing unit; display the degraded image on a display device; determine, responsive to selection of an object in the image, whether the selected object is a moving object or a stationary object;

in case the selected object is a moving object, identifying an object-tag assigned to the selected object and generating control-data comprising the object-tag;

in case the selected object is a stationary object, generating control-data comprising the image or part thereof; and sending the control-data to the sensing unit.

7. The surveillance system according to claim 6 wherein the computer device is configured to:

successively receive both the degraded images and high resolution image-segments of respective high resolution captured images;

display the degraded image and a high resolution image-segment generated from a common high resolution image as a merged image, wherein the image-segment is displayed in high resolution while an area surrounding the image-segment is displayed in degraded resolution; and adapt a location of the image-segment with respect to the degraded image according to a current location of a selected element.

8. The surveillance system according to claim 2 is configured to execute a command with respect to the at least one selected element notwithstanding a time-delay between a time when the sensing unit acquires the high resolution image with the at least one selected element, to a time when a corresponding command is received at the sensing unit with respect to the at least one selected element.

9. The surveillance system according to claim 1 wherein the sensing unit is located on an airborne vehicle.

10. The surveillance system according to claim 1, further comprising a display unit operatively connected to the at least one processor; the display device comprising a scroller configured to enable an operator to jump between different elements which are displayed in the degraded images.

11. A method of surveying an area, using a sensing unit configured to communicate over a communication link with a computer device computer device with data processing capabilities; the sensing unit comprises a high resolution imaging assembly operatively connected to at least one processor; the method comprising:

capturing a succession of high resolution images comprising one or more elements; wherein a bandwidth of the communication link is not sufficiently large to allow transmission of the high resolution images in a desired transmission rate; and with the help of the at least one processor performing at least the following:

generating degraded images from respective images in the succession of high resolution images; and transmit successively sensing-data to the computer device; the sensing-data comprising the degraded images and data indicative of one or more elements in the degraded images; wherein degradation is adapted to an available bandwidth of the communication link;

responsive to control-data received from the computer device, indicative of at least one selected element:

identifying a location of the selected element in recently captured high resolution images in the succession of high resolution images;

extracting respective high resolution image-segments from images in the succession of high resolution images, the image-segment comprising at least the selected element; and transmitting successively the respective high resolution image-segments to the computer device;

wherein the high resolution image-segments are adapted according to the available bandwidth of the communication link, thereby enabling the image-segments to be communicated at a the desired transmission rate.

12. The method according to claim 11, further comprising:

identifying from among the one or more elements, one or more objects of interest in the high resolution images; and assigning a respective object-tag to the one or more objects of interest to yield one or more respective tagged-objects;

wherein the sensing-data further comprises the object-tags.

13. The method according to claim 11, further comprising:

wherein the control-data further includes command instructions;

executing the command instructions only if the high resolution image-segments are validated at the computer device.

14. The method according to claim 11, further comprising: successively transmitting to the computer device, in a degraded frame rate, the succession of high resolution images.

15. The method according to claim 11, further comprising:

wherein the control-data further includes a track command instructing to track one or more given objects from among the one or more elements; and extracting the high resolution image-segments from images in the succession of high resolution images according to a current location of the one or more given objects in images from the succession of high resolution images.

16. The method according to claim 15, further comprising:
transmitting successively to the computer device, both the degraded images and high resolution image-segments of respective high resolution captured images;
displaying as a merged image a degraded image and a high resolution image-segment generated from a common high resolution image, wherein the image-segment is displayed in high resolution while an area surrounding the image-segment is displayed in degraded resolution; and
adapting a location of the image-segment with respect to the degraded image according to a current location of a selected element.

17. The method according to claim 15, further comprising:
transmitting successively to the computer device, both the degraded images and high resolution image-segments of respective high resolution captured images; and
displaying each one of a degraded image and a high resolution image-segment generated from the same high resolution image, separately on a different display device.

18. The method according to claim 11, further comprising:
identifying one or more moving objects from among the one or elements in images in the succession of high resolution images.

19. The method according to claim 12, wherein the identification of a location of the at least one selected element comprises:
determining whether the at least one selected element is a moving object or a stationary object;
in case the at least one selected element is a moving object, obtaining from the control-data an object-tag corresponding to the at least one selected object, and identifying the at least one selected element in the succession of high resolution images; and
in case the at least one selected element is a stationary object, obtaining from the control-data an image or part thereof, matching the image or part thereof to one or more recently captured high resolution images in the succession of high resolution images, and identifying the at least one selected element in the succession of high resolution images.

20. The method according to claim 12, further comprising:
receiving a degraded image from the sensing unit; displaying the degraded image on a display device; determining, responsive to selection of an object in the image, whether the selected object is a moving object or a stationary object;
in case the selected object is a moving object, identifying an object-tag assigned to the selected object, and generating control-data comprising the object-tag; and
in case the selected object is a stationary object, generating control-data comprising the image or part thereof; and sending the control-data to the sensing unit.

21. The method according to claim 20, further comprising:
successively receiving, both the degraded images and high resolution image-segments of respective high resolution captured images;
displaying the degraded image and a high resolution image-segment generated from a common high resolution image as a merged image, wherein the image-segment is displayed in high resolution while an area surrounding the image-segment is displayed in degraded resolution; and
adapting a location of the image-segment with respect to the degraded image according to a current location of a selected element.

22. The method according to claim 19, further comprising: executing a command with respect to the at least one selected element notwithstanding a time-delay between a time when the sensing unit acquires the image with the at least one selected element, to a time when a corresponding command is received at the sensing unit with respect to the at least selected element.

23. A non-transitory program storage device readable by a computer, tangibly embodying a program of instructions executable by the computer to perform method of surveying an area; the method comprising:
obtaining a succession of high resolution images captured by a high resolution image assembly, the high resolution images comprising one or more elements;
generating degraded images from respective images in the succession of high resolution images; transmitting successively sensing-data to a remote computer over a communication link; the sensing-data comprising the degraded images and data indicative of one or more elements of interest in the degraded images; wherein degradation is adapted to an available bandwidth of the communication link,
responsive to control-data received from the remote computer, indicative of at least one selected element:
identifying a location of the selected element in recently captured high resolution images in the succession of high resolution images;
extracting respective high resolution image-segments from images in the succession of high resolution images, the image-segments comprising at least the selected element; and
transmitting successively the respective high resolution image-segments to the remote computer; wherein the high resolution image-segments are adapted according to the available bandwidth of the communication link, thereby enabling the image-segments to be communicated in the desired transmission rate.

* * * * *

UNITED STATES PATENT AND TRADEMARK OFFICE
CERTIFICATE OF CORRECTION

| | | |
|---|---|---|
| PATENT NO. | : 10,546,386 B2 | Page 1 of 1 |
| APPLICATION NO. | : 15/555393 | |
| DATED | : January 28, 2020 | |
| INVENTOR(S) | : Ohad Rozenberg and Haim Somech | |

It is certified that error appears in the above-identified patent and that said Letters Patent is hereby corrected as shown below:

In the Claims

Column 20, Line 24 reading:
"sensing-data to the;"
Should be:
--sensing-data to the computer device;--

Column 22, Line 3 reading:
"a computer device computer device with"
Should be:
--a computer device with--

Signed and Sealed this
Twenty-seventh Day of October, 2020

Andrei Iancu
*Director of the United States Patent and Trademark Office*